United States Patent

Balloni et al.

Patent Number: 5,110,671
Date of Patent: May 5, 1992

[54] ONE SIDE HEAT SEALABLE POLYPROPYLENE FILM

[75] Inventors: Riccardo Balloni, Fairport; Jay K. Keung, Macedon, both of N.Y.

[73] Assignee: Mobil Oil Corporation, Fairfax, Va.

[21] Appl. No.: 711,718

[22] Filed: Jun. 7, 1991

Related U.S. Application Data

[63] Continuation of Ser. No. 389,440, Aug. 4, 1989, abandoned.

[51] Int. Cl.$^5$ .................. B32B 27/02; B32B 27/08
[52] U.S. Cl. ................... 428/218; 428/331; 428/349; 428/448; 428/484; 428/516; 428/910; 264/176.1
[58] Field of Search ............... 428/218, 331, 349, 448, 428/484, 516

[56] References Cited

U.S. PATENT DOCUMENTS

| | | | |
|---|---|---|---|
| 3,547,754 | 12/1970 | Tokos et al. | 428/516 |
| 4,343,852 | 8/1982 | Isaka et al. | 428/216 |
| 4,419,411 | 12/1983 | Park | 428/516 |
| 4,659,612 | 4/1987 | Balloni et al. | 428/213 |
| 4,692,379 | 9/1987 | Keung et al. | 428/349 |
| 4,764,425 | 8/1988 | Balloni et al. | 428/448 |

*Primary Examiner*—P. C. Sluby
*Attorney, Agent, or Firm*—A. J. McKillop; C. J. Speciale; J. P. O'Sullivan

[57] ABSTRACT

An oriented, multi-layer polymer film laminate having a core of isotactic polypropylene, an outside skin layer of isotactic polypropylene containing an anti-blocking agent and an inside heat sealable skin layer containing an anti-blocking agent and a coefficient of friction-reducing amount of a silicone oil.

15 Claims, No Drawings

ONE SIDE HEAT SEALABLE POLYPROPYLENE FILM

BACKGROUND OF THE INVENTION

This invention relates to the field of polymer film laminates and in particular, to a film laminate possessing an oriented polypropylene core layer faced on each side thereof with surface layers which are appropriate to the inside and the outside of a packaging film of this type. Oriented polypropylene packaging films are well known in the art. U.S. Pat. No. 4,659,612 describes a multi-layer film laminate which includes a core layer of oriented polypropylene, both surfaces of which carry a comparatively thin skin layer of oriented polypropylene containing an appropriate anti-block agent. One of the skin layers also has been compounded with a silicone oil in an amount such that when the film is rolled into a stock roll and subsequently unrolled, sufficient silicone oil is transferred to the opposite surface of the structure so as to adequately lower the coefficient of friction value of the surface.

U.S. Pat. No. 4,692,379 is directed to a multi-layer film structure also having a core layer of oriented polypropylene. However, on opposite surfaces of this core is laminated a heat sealable film structure, for example, an ethylene-propylene-butene-1 terpolymer. This terpolymer has incorporated therein an appropriate amount of an anti-block agent. One of these surface layers also has incorporated therein a silicone oil of a sufficient amount such that on rolling the film structure into a stock roll and subsequently unrolling the film sufficient silicone oil is transferred to the surface of the opposite skin layer. The amount of silicone oil transferred to the surface is such to significantly reduce the coefficient of friction value of this surface.

SUMMARY OF THE INVENTION

In accordance with the present invention there is provided an oriented, one-side heat sealable multi-layer polypropylene structure. This structure has excellent heat seal jaw release characteristics and hot slip properties. The structure also possesses a low coefficient of friction on both surfaces, acceptable receptivity for water-based coatings and good optical clarity. This structure comprises:

(a) a first outer layer of isotactic polypropylene, coextensively adherent to one surface of a core layer (b), said polypropylene having been compounded with an effective amount of an anti-block agent but being devoid of silicone oil, the exposed surface of said first layer being coated with a coefficient of friction-reducing amount of silicone oil transferred to said surface through contact with a silicone oil coating present upon the exposed surface of a second outer heat sealable surface layer (c);

(b) a core layer derived from an isotactic polypropylene; and (c) a second outer heat sealable surface layer coextensively adherent to the other surface of said core layer (b), said second layer (c) being formed from a polymer selected from the group consisting of an ethylene-propylene random copolymer, a propylene-butene-1 copolymer, an ethylene-butene-1 copolymer, an ethylene-propylene-butene-1 terpolymer and blends thereof, said polymer being compounded with an effective amount of an anti-blocking agent and a quantity of silicone oil such that a coefficient friction-reducing amount thereof will be present on the exposed surface of the layer (c) as well as the exposed surface of layer (a) following mutual contact of said surfaces.

The films of the present invention find their principal utility as a wrapping material. It is to be understood that the present structure can be laminated to other film layers.

The phraseology "water-based coating" is to be understood in its broadest sense and includes water-base inks and water-based adhesives.

Unlike the prior art composite films which may contain a fatty acid amide, such as, erucamide, stearamide, behenamide, etc., to impart lubricity or slip to the films, e.g., the multi-layer films described in U.S. Pat. Nos. 4,343,852 and 4,419,411, the film of this invention does not contain such an ingredient. This material has been eliminated because it usually interferes with the receptivity of the film surface for, and the adhesion of, water-based inks and water-based adhesives. Moreover, when concentrated at the film surface, a fatty acid amide can appreciably reduce the optical clarity of the film.

A heat sealable film possessing both good lubricity and both good receptivity for water-based surface coating materials and optical clarity, such as the film of the present invention, is highly advantageous since it permits the convertor/end user to utilize inks and/or adhesives which do not incorporate organic solvents. Organic solvents generally present health, explosion and fire hazards and resort must be had to expensive ventilation and safety equipment to provide an acceptable working environment where they are used. Even with the use of such equipment, in some jurisdictions, the atmospheric emisson of organic solvents is prohibited and expensive solent recovery systems are required to comply with legal limitations. The films herein avoid organic solvent-containing coating materials thereby eliminating the health, safety and environmental problems attendant their use as well as the cost of the equipment required to deal with the hazards which they pose.

Films of the present invention must be capable of trouble-free machinability on high speed packaging machines. This simply means that the film has to be able to be transported through the packaging machinery without the film causing any jamming during packaging. One cause of machine jamming has been traced to the outer surface of the film sticking to the heat sealing jaws during the process of packaging. The present film structure avoids this problem.

DESCRIPTION OF THE PREFERRED EMBODIMENTS

Two of the three layers of the polymer film laminate herein are derived from a polypropylene of high stereoregularity and in general will be chosen from among the highly isotactic polypropylenes. These two layers can be prepared from the identical isotactic polypropylene or from two varieties thereof. The preferred polypropylenes are well known in the art and are formed by polymerizing polypropylene in the presence of stereospecific catalyst systems. The polypropylenes can have a melt index at 230° C., ranging from about 1.0 to about 25.0. The crystalline melting point is about 160° C. The number average molecular weight ranges from about 25,000–100,000 and density ranges from about 0.90 to 0.91.

The three layers of the structure of the present invention usually will be coextruded. Prior to extrusion, the outer layer is compounded with an anti-blocking effective amount of an anti-blocking agent, e.g., silica, silicate, clays, talc, glass and the like which are preferably provided in the form of approximately spheroidal particles. Syloid 244 (W. R. Grace & Co., Davison Chemical Division), a synthetic silica, and Sipernat 44 (Degussa), a synthetic silicate generally provide good results. The major portion of these particles, i.e., anywhere from more than half to as high as 90 wt. % or more, will be of such a size that a significant portion of their surface area for example, from about 10 to about 70% thereof, will extend beyond the exposed surface of said outer layer.

The second outer heat-sealable surface layer (c) is derived from an ethylene-propylene-butene-1 terpolymer, an ethylene-propylene random copolymer, a propylene-butene-1 copolymer, an ethylene-butene-1 copolymer, or blends thereof. Suitable terpolymers are those obtained from the random interpolymerization of from about 1 to about 8 wt. % ethylene, preferably from about 3 to about 5 wt. % ethylene, with from about 65 to 95 wt. % propylene, preferably from about 86 to about 93 wt. % propylene; butene-1 representing the balance. The foregoing terpolymers are for the most part characterized by a melt index at 230° C. of from about 2 to about 16 and advantageously from about 3 to about 7, a crystalline melting point of from about 100° C. to about 120° C., an average molecular weight of from about 25,000 to about 100,000 and a density within the range of from about 0.89 to about 0.92 gm/cm$^3$.

The EP random copolymers generally contain from about 2 to about 7 wt. % ethylene, the balance being made up of propylene. The copolymers can have a melt index at 230° C., generally ranging from about 2 to about 15 and preferably from about 3 to about 8. The crystalline melting point is usually from about 125° C. to about 150° C. and the number average molecular weight range is from about 25,000 to 100,000. The density will usually range from about 0.89 to about 0.92 gm/cm$^3$.

In general, where blends of terpolymer and random copolymer are used, the blends will contain from about 10 to about 90 wt. % terpolymer and preferably from about 40 to about 60 wt. % terpolymer, the balance being made up of random copolymer.

The inside surface layer (c) is compounded with, in addition to the anti-block agent, a silicone oil. The silicone oil advantageously possesses a viscosity of from about 350 to about 600,000 centistokes with 10,000 to about 60,000 centistokes being especially preferred. Examples of suitable silicone oils are polydialkylsiloxanes, polyalkylphenylsiloxanes, olefin-modified siloxane oils, polyethylene-modified silicone oils, olefin-polyether-modified silicone oils, epoxy-modified silicone oils, alcohol-modified silicone oils and polydialkylsiloxanes which preferably have from about 1 to about 4 carbon atoms in the alkyl group, in particular polydimethyl-siloxanes. Of the foregoing, the polydialkylsiloxanes, in particular, a polydimethylsiloxane, are preferred for use herein.

The silicone oil is added to layer (c) generally in the form of a dispersion or emulsion, the silicone oil being present within, as well as on the exposed surface of, this layer as discrete microglobules, frequently of an average size of from about 1 to about 2 microns. The silicone oil, which is generally substantially uniformly distributed on the exposed surface of layer (c), is responsible for imparting a reduced coefficient of friction to this surface as well as to the exposed surface of layer (a) when some of the oil is transferred thereto after these surfaces have been placed in mutual contact, e.g., as will occur when the laminate film has been wound on a winding coil to form a stock roll.

Polydimethylsiloxane or other silicone oil can be present at from about 0.15 to about 4.0 wt. % of lower layer (c). Some of the silicone oil will be present on the exposed surface layer (c). The amount selected should in any event be sufficient to provide a coefficient of friction of layers (a) and (c), following transfer of silicone oil microglobules to the latter, of about 0.4 or less, preferably between about 0.20 to about 0.3 up to at least about 60° C. Because of the manner in which the silicone oil is applied to just the exposed surface of outer layer (a) such layer exhibits an improved coefficient of friction but not at the expense of its receptivity to water-based optical clarity.

The silicone oil should be incorporated as homogeneously as possible in the polymer constituting layer (c). This can be achieved by either incorporating the silicone oil as a dispersion or emulsion at room temperature and then heating the blend with the application of shearing forces or by incorporating the oil while the blend is being melted. The mixing temperature must be high enough to soften the blend and enable a very uniform mixture to be formed. The temperature required in a kneader or extruder is generally from about 170° to about 270° C.

Core layer (b) preferably contains an antistatic agent, e.g. an etholated tertiary amine, such as cocoamine, N,N-bis (2-hydroxyethyl) stearylamine and glycerol monostearate. Core layer (b) will usually represent about 70 to about 90% of the thickness of the overall film laminate or an even higher percentage thereof. First outer layer (a) and second outer layer (c) are coextensively applied to each major surface or core layer (b) usually by being coextruder directly thereon. For example, the individual polymer streams constituting the material of layers (a), (b) and (c) can be coextruded from a conventional extruded through a flat sheet die, the melt streams being combined in an adapter prior to being extruded from the die. Each of the surface layers (a) and (c) can comprise, for example, approximately 6.0% of the total thickness of the laminate. After leaving the die orifice, the laminate stucture is chilled and the quenched sheet then heated and stretched, e.g., five times in the machine direction and then subsequently, for example, eight times in the tranverse direction. The edges of the film can be trimmed. The film laminate has been wound onto a reel in order to effect transfer of silicone oil from the exposed surface layer (c) to the exposed surface of layer (a) as previously explained. The overall thickness of the laminate is not critical and advantageously can range from about 0.35 to about 2.0 mile.

In the following Examples, Example 1 illustrates a film laminate wherein skin layers (a) and (c) are both of the stated terpolymer resin. Example 2 is the same as Example 1 except layers (a) and (c) are both of a homopolymer polypropylene identical to that of core layer (b). Example 3 is illustrative of a laminate film in accordance with the invention. Examples 4 and 5 are the same structure as Example 3 but with an antistatic agent in the core layer.

EXAMPLE 1

Comparative Example

A core layer (b) of about 20 microns thickness derived from a propylene homopolymer of high stereoregularity (Fina 3378XB) containing 1500 ppm of erucamide, is melted and coextruded with an outer surface layer (a) of about 0.61 microns thickness derived from an ethylene-propylene-butene-1 terpolymer (CHISSO XF7700) and an inside surface layer (c) of the same terpolymer and of a thickness of about 1.2 microns. The surface layers (a) and (c) each contain 0.23 wt. % Sylobloc 44. This is an antiblock of synthetic amorphous silica in the form of approximately spherical particles averaging 3 microns in diameter. Layer (c) was formulated so as to include 1.2 wt. % polydimethylsiloxane, 30,000 cs. The extrudate is quenched, reheated, and stretched 4–6 times in the machine direction at approximately 260° F. Subsequently, the sheet is stretched 8–10 times in the transverse direction at approximately 330° F. in a tenter frame. Layer (a) is corona discharge treated in a conventional manner to 38 dynes/cm and wound in a mill roll form. The coefficient of friction of layers (a) and (c) is 0.25 and 0.40, respectively.

To simulate end use machine performance, the film of the sample was run on a Campbell wrapper horizontal form fill and seal machine. At a temperature between 250° and 270° F., the sample performed well with no sticking. At an elevated temperature between 280° and 300° F. the film caused machine jamming due to excessive sticking at the sealing jaw region of the machine.

EXAMPLE 2

Comparative Example

Example 1 was repeated except layer (a) was replaced by a homopolymer polypropylene identical to the core layer but containing 0.23 wt. % Sylobloc 44 antiblock agent.

The Campbell wrapper machine test was repeated. The apparatus handled the film well over the entire temperature range i.e. this film had good machinability. Sealing jaw stick and consequent machine jamming was not observed. However, the seal range was reduced by 20° F. due to the deleterious effect the corona discharge treatment had on the (c) layer. Coefficient of friction and hot slip characteristics were substantially higher than in Example 1.

EXAMPLE 3

Example 2 was repeated with the same structure as in Example 2 except flame treatment was employed instead of corona treatment. The flame treatment produced the same surface effect and to the same extent as corona treatment. Off-line testing showed improved coefficient of friction values on the untreated (c) layer due to complete elimination of the effect of corona discharge treatment on the surface side of layer (c). Corona discharge treatment has the detrimental effect of increasing the COF of the surface of the untreated side.

The Campbell wrapper machine test was repeated. The film of Example 3 showed excellent machinability and its seal range was 20° F. broader than that of Example 2 because of the absence of corona back side treatment effect. The COF and hot slip values were excellent. The homopolymer polypropylene (a) layer improved machinability by eliminating the sealing jaw sticking problem. Flame treating the surface of the (a) layer did away with the deleterious effects resulting from an uncontrolled corona discharge treatment regarding the surface of the (c) layer.

Optionally, layers (a) and/or (c) can contain a minor amount of wax, e.g., a microcrystalline wax for added lubricity. Amounts of wax from about 2 to about 15 wt. % of either or both layers (a) and (c) can be used if desired. Either or both of these layers can also contain pigments, fillers, stabilizers, light protective agents or other suitable modifying ingredients if desired.

EXAMPLE 4

Example 3 was repeated with the same structure and flame treatment. However, 1000 ppm Armostat 410, tertiary amine anti-static agent was incorporated into layer (b). Machinability was excellent and dust pick-up due to static cling was reduced.

EXAMPLE 5

Example 4 was repeated with the same structure and flame treatment. However, instead of the tertiary amine, a blend of 2000 ppm N,N-bis (2-hydroxyethyl) stearylamine and 1000 ppm glycerol monostearate was used. Machinability was excellent and static cling was eliminated.

We claim:

1. A polymer film laminate comprising:
   (a) A first outer layer of isotactic polypropylene, coextensively adherent to one surface of a core layer (b), said polypropylene having been compounded with an effective amount of an anti-blocking agent but being devoid of silicone oil, said polypropylene first outer layer having been flame treated, the exposed surface of said first outer layer being coated with a coefficient of friction-reducing amount of silicone oil transferred to said surface through contact with a silicone oil coating present upon the exposed surface of a second outer heat sealable surface layer (c);
   (b) a core layer derived from an isotactic polypropylene; and
   (c) a second heat sealable outer surface layer coextensively adherent to the other surface of said core layer (b), said second outer layer being formed from a polymer selected from the group consisting of an ethylene-propylene-butene-1 terpolymer, an ethylene-propylene-random copolymer, a propylene-butene-1 copolymer, an ethylene-butene-1 copolymer, and blends thereof, said polymer being compounded with an effective amount of an anti-blocking agent and a quantity of silicone oil such that a coefficient of friction-reducing amount thereof will be present on the exposed surface of said second outer surface as well as the exposed surface of layer (a) following mutual contact of said surfaces.

2. The laminate of claim 1 containing a wax in layer (a) and/or (c).

3. The laminate of claim 1 containing a microcrystalline wax in layer (a) and/or (c).

4. The laminate of claim 1 in which the silicone oil is a polydialkylsiloxane.

5. The laminate of claim 1 in which the silicone oil is a polydimethylsiloxane.

6. The laminate of claim 1 in which a sufficient amount of silicone oil is incorporated into layer (c) as to confer upon the exposed surfaces of layers (a) and (c)

following their mutual contact, a coefficient of friction of less than about 0.4 up to at least about 60° C.

7. The laminate of claim 1 in which a sufficient amount of silicone oil is incorporated into layer (c) as to confer upon the exposed surfaces of layers (a), and (c) following their mutual contact, a coefficient of friction of from about 0.25 to about 0.3 up to at least about 60° C.

8. The laminate of claim 1 in which the anti-blocking agent is silica or silicate.

9. The laminate of claim 1 in which the anti-blocking agent is silica in the form of spherical particles.

10. The laminate of claim 1 in which from about 10 to about 70% of the total surface area of the anti-blocking agent extends beyond the exposed surface of layers (a) and (c).

11. The laminate of claim 1 in which the isotactic polypropylene constituting each of layers (a) and (b) possess a melt index at 230° C. of from about 1.0 to about 25.0, a crystalline melting point of about 160° C., a number average molecular weight range of from about 25,000 to about 100,000 and, a density of from about 0.90 to about 0.91.

12. The laminate of claim 1 in which layer (b) constitutes at least about 70% of the total thickness of the laminate with the balance of the thickness of the laminate being distributed between layers (a) and (c).

13. The laminate of claim 12 in which the total thickness of the laminate is from about 0.35 to about 2.0 mils.

14. The laminate of claim 1 wherein layer (b) contains an antistatic effective amount of an anti-static agent.

15. The laminate of claim 14 wherein the antistatic agent is selected from the group consisting of a tertiary amine, N,N-bis (2-hydroxyethyl) stearylamine, glycerol monostearate and blends thereof.

* * * * *

UNITED STATES PATENT AND TRADEMARK OFFICE
CERTIFICATE OF CORRECTION

PATENT NO. : 5,110,671

DATED : May 5, 1992

INVENTOR(S) : R. Balloni, J. Keung and L. Keller

It is certified that error appears in the above-identified patent and that said Letters Patent is hereby corrected as shown below:

Title page, item [75] add --Lajos E. Keller--

Signed and Sealed this

Fourteenth Day of September, 1993

*Attest:*

BRUCE LEHMAN

*Attesting Officer*     *Commissioner of Patents and Trademarks*